May 26, 1925.
F. P. JOHNSON
WHEEL RIM
1,539,317
Filed March 28, 1924
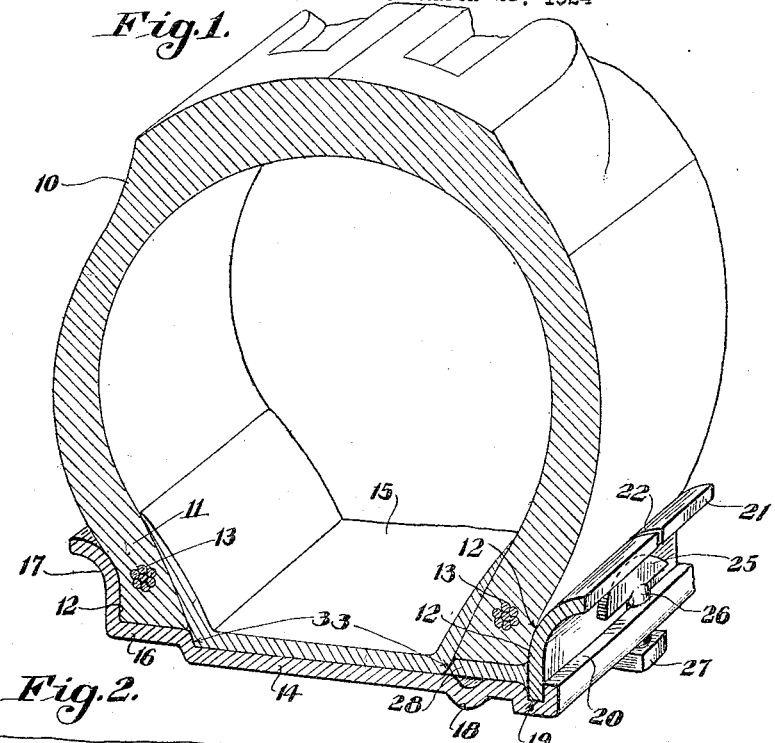
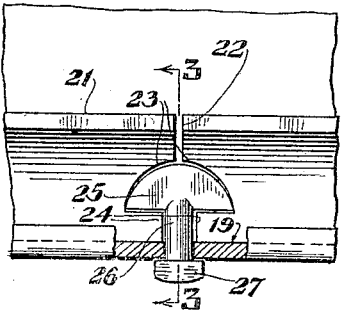
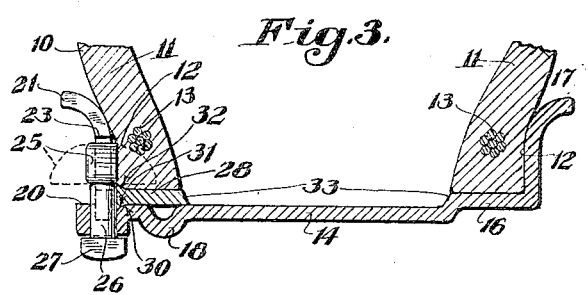
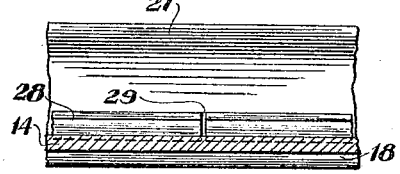
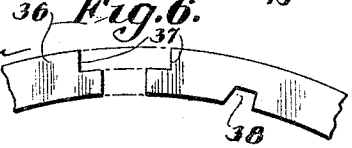
INVENTOR
Frank P. Johnson
WITNESSES
Louis Goodman
E. N. Lovewell
BY
ATTORNEY Patented May 26, 1925.

1,539,317

UNITED STATES PATENT OFFICE.

FRANK P. JOHNSON, OF DANVILLE, PENNSYLVANIA.

WHEEL RIM.

Application filed March 28, 1924. Serial No. 702,640.

*To all whom it may concern:*

Be it known that I, FRANK P. JOHNSON, a citizen of the United States, residing at Danville, in the county of Montour and State of Pennsylvania, have invented a new and useful Wheel Rim, of which the following is a specification.

This invention relates to a wheel rim of the type which is adapted to support a pneumatic tire casing, and its general object is to provide a construction whereby the process of removing the casing from the rim or replacing it thereon is greatly facilitated. With my improved construction, it is preferable, though not essential, that the rim be detachable from the felly. My invention is of especial value when used in connection with balloon tires, the shape of which makes it particularly difficult to get them onto or off from the rims now commonly used.

The rim comprising the present invention is preferably used in connection with a split retaining ring, which is similar in construction to that disclosed in U. S. Patent No. 1,262,504, issued to me April 9, 1918.

The specific construction of my invention and the advantages thereof will be more particularly described in connection with the accompanying drawings, in which Figure 1 is a perspective view of a section of a wheel rim embodying the invention.

Figure 2 is a detail view, partly in elevation and partly in section, showing the means for securing the retaining ring.

Figure 3 is a cross sectional view through the rim showing the locking device in elevation.

Figure 4 is a longitudinal section of a fragment of the rim looking outwardly.

Figure 5 is a cross sectional view of a rim of modified construction.

Figure 6 is a fragmentary view of the retaining ring used in the construction shown in Figure 5.

The invention, as illustrated in Figure 1, is adapted to be used in connection with a pneumatic tire casing 10, having beads 11 with straight sides 12, and reinforced, as shown at 13, so as to render the same non-stretchable. The main or body portion 14 of the rim is formed with a smooth substantially cylindrical outer surface adapted to receive the flap 15, and is formed at one side with an integral ledge 16, on which one of the beads 11 is adapted to rest. Adjacent the ledge 16 is an integral retaining flange 17 adapted to be engaged by the straight edge 12 of the bead, and to retain the same on the ledge 16. The opposite side of the body portion 14 is formed with a rib 18 to be engaged in the usual manner by lugs, which fasten the rim to the felly. At the outer edge, the rim is formed with an annular channel 19, the outer flange of which terminates in the edge 20, having a diameter equal to or slightly less than the diameter of the ledge 16. The channel 19 is adapted to removably receive a retaining ring 21, which is similar in shape to the flange 17. This retaining ring is split at 22, so that it may be removed from the channel 19, preparatory to removing the tire from the rim. The adjacent ends of the ring 21 are formed with opposed recesses 23, underneath which are opposed lugs 24 adapted to be engaged by the flattened head 25 of a locking bolt 26 to positively retain the locking ring in position. The outer end of the bolt 26 is provided with a polygonal head 27, by means of which it may be turned to the position shown in Figures 2 and 3 to lock the ring, or may be turned transversely, so that the ring may be released and lifted out of the channel 19 and removed from the rim. This is the construction shown in my aforesaid Patent No. 1,262,504.

On the side of the body portion 14, opposite to the ledge 16, rests a removable ledge section 28, the upper or outer surface of which, as shown in Figures 1 and 3, is in alinement with the corresponding surface of the ledge 16. This removable ledge section 28 is preferably split, as at 29, to facilitate its removal from the body portion 14 of the rim, and the body portion of the rim, adjacent the inner side of the channel 19, is preferably formed with a rounded shoulder 30 to form a small space for receiving a flange 31 formed on the edge of the ledge section 28, to prevent the latter from being pushed inwardly too far, and thus interlock the ledge section therewith. The ledge section 28 may also be formed with an outwardly projecting flange 32 for engaging the outer corner of the tire bead 11. The inner sides of the ledge 16 and ledge section 28, respectively, are formed with sloping shoulders, as indicated at 33, which merge into the surface of the body portion 14, and the ledges being comparatively narrow, it is a simple matter to remove or replace the tire.

In the modification shown in Figures 5 and 6, the main or body portion of the rim is the same as shown in Figure 1, but the removable flange 34 is formed integral with the removable ledge section 35, and is preferably split, although this is not absolutely essential. The retaining ring 36 is secured within the channel 19 and extends outwardly far enough to engage and retain the flange and ledge section 34, 35. The adjacent ends of the retaining ring 36 are formed with notches 37 for engagement by a suitable locking bolt, such as is shown in Figures 2 and 3. The ring 36 is also preferably provided on its inner edge with notches 38 for engagement by suitable projections on the rim for better securing it in position.

The invention in all of its forms includes a rim, having at one side a removable flange, which, when removed, permits the tire casing to be slipped off of the rim. The rim itself need not be split, and it is not even necessary to remove it from the felly. The ledge adjacent the removable flange may be separately removable, as in Figure 1, or removable as an integral part of the flange, as in Figure 5. With rims as heretofore constructed, however, having a flat surface extending substantially from side to side of the rim, it is very difficult to remove the tire casing, especially of balloon tires which are of considerable width, since the beads are nonstretchable, and if the tire at one point is moved a little farther than it is at another point, it becomes wedged on the rim. Even more difficulty is experienced in connection with split rims, which do not have a removable flange. All of these difficulties are eliminated by the use of the present invention, since it is a very simple matter to remove the ledge section 28 or 35, and to slip the opposite bead of the tire from the ledge 16 to the main portion 14 of the rim, over which it may move with perfect freedom.

From the foregoing description, it will be noted that the principles of the invention may be embodied in various different forms without any material departure from the salient features thereof. It is, therefore, my intention to include all such modifications within the scope of the claims hereunto appended.

What is claimed is:

1. A wheel rim having a body portion with an integral flange at one side, and an integral ledge inside the flange, the inner side of said ledge being in the form of an inwardly sloping shoulder, the remainder of the body portion extending from said shoulder and being of substantially uniform diameter and having an annular channel near its opposite side, a split retaining ring removably locked in said channel, and a removable ledge section inside said retaining ring and retained thereby, said ledge section having an interlocking engagement with the rim to prevent said section from being pushed inwardly too far.

2. A wheel rim having a body portion with an integral flange at one side, and an integral ledge inside the flange, the inner side of said ledge being in the form of an inwardly sloping shoulder, the remainder of the body portion extending from said shoulder and being of substantially uniform diameter and having an annular channel near its opposite side, a split retaining ring removably locked in said channel, and a removable ledge section inside said retaining ring and retained thereby, said ledge section having an outwardly projecting flange for engaging the outer corner of the bead of a tire.

3. A wheel rim having a body portion with an integral flange at one side and an integral ledge inside the flange, the remainder of the body portion having a cylindrical surface of substantially uniform diameter less than the diameter of the ledge and having an annular channel near its opposite side, a split retaining ring removably located in said channel, and a removable ledge section inside said retaining ring and retained thereby, said removable ledge section having an inward projection at its outer edge engageable between the retaining ring and the inner wall of the channel to fix the position of said ledge section.

4. A wheel rim having a body portion with an integral flange at one side and an integral ledge inside the flange terminating at its inner side with an inwardly sloping shoulder, the remainder of the body portion having a cylindrical surface of substantially uniform diameter less than the diameter of the ledge and merging into said sloping shoulder, said body portion having near its opposite side an annular channel, a split retaining ring having a flat inner face removably locked in said channel, and a removable ledge section inside said retaining ring and retained thereby, said ledge section being similar in shape to the integral ledge and opposed thereto, the inner wall of said channel forming a rounded annular shoulder, and said removable ledge section having a correspondingly shaped flange projecting inwardly from its outer edge and filling the space between said rounded shoulder and the flat inner face of the retaining ring to fix the position of said removable ledge section.

In testimony, that I claim the foregoing as my own, I have hereto affixed my signature.

FRANK P. JOHNSON.